US012655313B2

(12) United States Patent
Kuriki et al.

(10) Patent No.: US 12,655,313 B2
(45) Date of Patent: Jun. 16, 2026

(54) WATER-BASED INK FOR INK-JET RECORDING AND INK-JET RECORDING APPARATUS

(71) Applicant: Brother Kogyo Kabushiki Kaisha, Nagoya (JP)

(72) Inventors: Hirofumi Kuriki, Nagoya (JP); Shunichi Higashiyama, Yokkaichi (JP); Taro Nagano, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1053 days.

(21) Appl. No.: 17/538,030

(22) Filed: Nov. 30, 2021

(65) Prior Publication Data

US 2022/0112389 A1 Apr. 14, 2022

Related U.S. Application Data

(63) Continuation of application No. PCT/JP2020/013085, filed on Mar. 24, 2020.

(30) Foreign Application Priority Data

May 31, 2019 (JP) ................................. 2019-102152

(51) Int. Cl.
| | |
|---|---|
| *C09D 11/38* | (2014.01) |
| *C09D 11/322* | (2014.01) |
| *C09D 11/326* | (2014.01) |

(52) U.S. Cl.
CPC ............ *C09D 11/38* (2013.01); *C09D 11/322* (2013.01); *C09D 11/326* (2013.01)

(58) Field of Classification Search
CPC ..... C09D 11/38; C09D 11/322; C09D 11/326; C09D 11/102; C09D 11/106; C09D 11/107
See application file for complete search history.

(56) References Cited

U.S. PATENT DOCUMENTS

| | | | |
|---|---|---|---|
| 5,609,671 | A | 3/1997 | Nagasawa |
| 8,435,339 | B2 | 5/2013 | Koyano et al. |

(Continued)

FOREIGN PATENT DOCUMENTS

| | | |
|---|---|---|
| CN | 101056954 A | 10/2007 |
| CN | 101784621 A | 7/2010 |

(Continued)

OTHER PUBLICATIONS

"2-Amino-2-Methyl-1-Propanol." National Center for Biotechnology Information. PubChem Compound Database, U.S. National Library of Medicine, pubchem.ncbi.nlm.nih.gov/compound/2-AMINO-2-METHYL-1-PROPANOL. Accessed Oct. 4, 2024. (Year: 2024).*

(Continued)

*Primary Examiner* — Amber R Orlando
*Assistant Examiner* — Jeffrey Eugene Barzach
(74) *Attorney, Agent, or Firm* — Banner & Witcoff, Ltd.

(57) ABSTRACT

A water-based ink for ink-jet recording includes: a liquid component which is liquid at 20° C.; and a solid component which is solid at 20° C. The liquid component includes: a first water-soluble organic solvent of which vapor pressure at 20° C. is not less than 7 Pa; a second water-soluble organic solvent of which vapor pressure at 20° C. is not more than 1 Pa; and water. The solid component includes at least one resin selected from the group consisting of: acrylic acid-based resin, maleate ester-based resin, vinyl acetate-based resin, carbonate-based resin, styrene-based resin, ethylene-based resin, propylene-based resin, urethane-based resin, vinyl chloride-based resin and copolymer resin thereof.

12 Claims, 1 Drawing Sheet

(56) References Cited

U.S. PATENT DOCUMENTS

| | | | |
|---|---|---|---|
| 9,878,541 B2 | 1/2018 | Maeda et al. | |
| 10,053,592 B2 | 8/2018 | Ozawa et al. | |
| 2007/0100024 A1 | 5/2007 | Gu et al. | |
| 2008/0234407 A1 | 9/2008 | Tanaka et al. | |
| 2009/0186162 A1* | 7/2009 | Namba | C09D 11/322 |
| | | | 427/511 |
| 2009/0229489 A1 | 9/2009 | Gu | |
| 2010/0196602 A1 | 8/2010 | Koyano et al. | |
| 2011/0292116 A1 | 12/2011 | Sago et al. | |
| 2011/0316947 A1 | 12/2011 | Kojima et al. | |
| 2015/0025179 A1* | 1/2015 | Landa | C08K 5/23 |
| | | | 524/88 |
| 2015/0344713 A1 | 12/2015 | Mizushima et al. | |
| 2017/0182779 A1 | 6/2017 | Maeda et al. | |
| 2017/0210919 A1* | 7/2017 | Yoshimasa | C09D 11/322 |
| 2017/0267885 A1 | 9/2017 | Wakabayashi et al. | |
| 2017/0342288 A1 | 11/2017 | Kitade et al. | |
| 2018/0118965 A1 | 5/2018 | Tabuchi et al. | |
| 2018/0148591 A1 | 5/2018 | Ozawa et al. | |
| 2018/0371273 A1 | 12/2018 | Nishiura | |
| 2019/0047308 A1 | 2/2019 | Kutsuwa et al. | |
| 2019/0092954 A1* | 3/2019 | Nishiura | C09D 11/106 |
| 2020/0199387 A1* | 6/2020 | Utsugi | C08L 33/064 |

FOREIGN PATENT DOCUMENTS

| | | | |
|---|---|---|---|
| CN | 104870577 A | 8/2015 | |
| CN | 106573485 A | 4/2017 | |
| CN | 108102462 A | 6/2018 | |
| EP | 3192662 A1 | 7/2017 | |
| JP | H08-3498 A | 1/1996 | |
| JP | H11-228895 A | 8/1999 | |
| JP | 2000-513396 A | 10/2000 | |
| JP | 2003-213179 A | 7/2003 | |
| JP | 2008-524400 A | 7/2008 | |
| JP | 2008-260926 A | 10/2008 | |
| JP | 2009-515007 A | 4/2009 | |
| JP | 2010-202845 A | 9/2010 | |
| JP | 2011-515535 A | 5/2011 | |
| JP | 2013-216862 A | 10/2013 | |
| JP | 2014-159533 A | 9/2014 | |
| JP | 2016-043695 A | 4/2016 | |
| JP | 2017115075 A | 6/2017 | |
| JP | 2017-186505 A | 10/2017 | |
| JP | 2018-070827 A | 5/2018 | |
| JP | 2019-059844 A | 4/2019 | |
| WO | 97/48769 A1 | 12/1997 | |
| WO | 2006/066132 A2 | 6/2006 | |
| WO | 2007/053564 A2 | 5/2007 | |
| WO | 2009/117071 A1 | 9/2009 | |
| WO | 2014/098002 A1 | 6/2014 | |
| WO | 2017/138186 A1 | 8/2017 | |

OTHER PUBLICATIONS

Mar. 7, 2023—(US) Notice of Reasons for Refusal—App 2019-102152.

Jul. 12, 2022—(CN) The First Office Action—App 202080040479.5.

Nov. 23, 2022—(CN) Decision of Rejection—App 202080040479.5.

Jul. 1, 2020—International Search Report—App PCT/JP2020/013085.

Jul. 1, 2020—(WO) Written Opinion of ISA—App PCT/JP2020/013085.

* cited by examiner

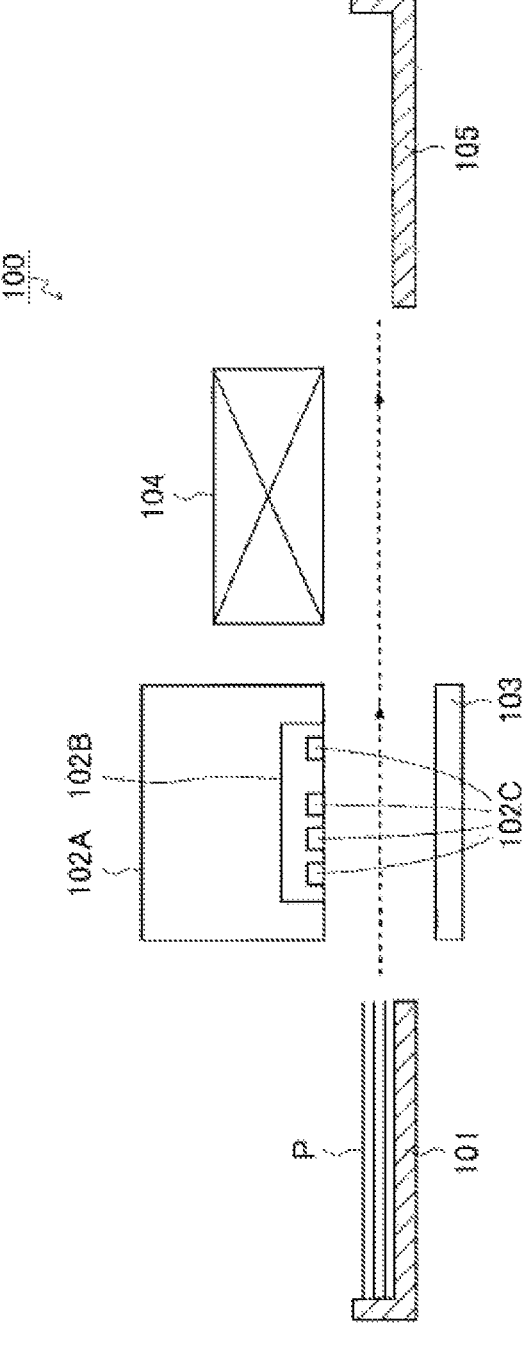

WATER-BASED INK FOR INK-JET RECORDING AND INK-JET RECORDING APPARATUS

CROSS REFERENCE TO RELATED APPLICATIONS

This application is a Continuation application of International Application No. PCT/JP2020/013085 which was filed on Mar. 24, 2020 claiming the conventional priority of Japanese patent Application No. 2019-102152 filed on May 31, 2019. The disclosures of Japanese patent Application No. 2019-102152 and International Application No. PCT/JP2020/013085 are incorporated herein by reference in their entirety.

BACKGROUND

The present disclosure relates to a water-based ink for ink-jet recording and an ink-jet recording apparatus.

For the purpose of realizing both of the suppression of clogging of nozzle(s) in an ink-jet head and the improvement in drying property on a recording medium, there is proposed a water-based ink for ink-jet recording including a water-soluble solid urea derivative of which melting point is not less than 50° C., and a water-soluble liquid urea derivative of which melting point is not more than 10° C.

SUMMARY

However, in the water-based ink for ink-jet recording, depending on the selections of the kinds of a liquid component and a solid component and of the amount ratio thereof, any suppression of the clogging of nozzle is not achieved, and/or a drying state on the recording medium is unsatisfactory, in some cases.

In view of the above situation, an object of the present disclosure is to provide a water-based ink for ink-jet recording which is capable of suppressing the clogging of nozzle and which has a satisfactory drying state on a recording medium.

According to a first aspect of the present disclosure, there is provided a water-based ink for ink-jet recording including:

a liquid component which is liquid at 20° C.; and a solid component which is solid at 20° C.

The liquid component includes:

a first water-soluble organic solvent of which vapor pressure at 20° C. is not less than 7 Pa;

a second water-soluble organic solvent of which vapor pressure at 20° C. is not more than 1 Pa; and water.

The solid component includes at least one resin selected from the group consisting of: acrylic acid-based resin, maleate ester-based resin, vinyl acetate-based resin, carbonate-based resin, styrene-based resin, ethylene-based resin, propylene-based resin, urethane-based resin, vinyl chloride-based resin and copolymer resin thereof.

The water-based ink for ink-jet recording satisfies the following conditions (1) and (2):

$$2 \le (A + B + C)/D \le 6 \qquad \text{Condition (1)}$$

$$0.2 \le (B + C)/D \le 1 \qquad \text{Condition (2)}$$

in the conditions (1) and (2),

A: a content amount (% by mass) of the first water-soluble organic solvent in an entire amount of the water-based ink, B: a content amount (% by mass) of the second water-soluble organic solvent in the entire amount of the water-based ink, C: a content amount (% by mass) of a component included in the liquid component and different from the first water-soluble organic solvent, the second water-soluble organic solvent and the water in the entire amount of the water-based ink, and D: a content amount (% by mass) of the solid component in the entire amount of the water-based ink.

According to a second aspect of the present disclosure, there is provided an ink-jet recording apparatus including:

an ink storage storing therein the water-based ink for ink-jet recording of the first aspect, and an ink-jet head configured to discharge the ink stored in the ink storage.

According to a third aspect of the present disclosure, there is provided an ink-jet recording method including discharging, onto a recording medium, the water-based ink for ink-jet recording of the first aspect.

BRIEF DESCRIPTION OF THE DRAWINGS

FIG. 1 is a schematic view depicting the configuration of an example of an ink-jet recording apparatus related to the present disclosure.

DETAILED DESCRIPTION

A water-based ink for ink-jet recording related to the present disclosure (hereinafter also referred to as a "water-based ink" or an "ink", in some cases) is suitably usable in an ink-jet recording onto a recording medium having hydrophobicity such as, for example, coated paper, plastic, film, an OHP sheet, etc., but is not limited to or restricted by this usage. The water-based ink for ink-jet recording related to the present disclosure is also usable, for example, in the ink-jet recording onto a recoding medium which is different from the hydrophobic recording medium and which includes, for example, regular paper (plain paper), glossy paper, mat paper, etc. In the present disclosure, the term "coated paper" means, for example, paper obtained by coating, with a coating agent, regular paper of which main constituent is pulp, such as high-grade print paper and middle-grade print paper. The coating agent is applied to the regular paper to improve its smoothness, whiteness, brightness, etc. The coated paper is exemplified by high-grade coated paper, middle-grade coated paper, etc.

The water-based ink related to the present disclosure will be explained. The water-based ink related to the present disclosure includes a liquid component which is liquid at 20° C. and a solid component which is solid at 20° C.

The liquid component includes a first water-soluble organic solvent, a second water-soluble organic solvent and water. The liquid component may further include a component different from the first water-soluble organic solvent, the second water-soluble organic solvent and the water. Alternatively, the liquid component may be composed only of the first water-soluble organic solvent, the second water-soluble organic solvent and the water.

Vapor pressure at 20° C. of the first water-soluble organic solvent is not less than 7 Pa. The first water-soluble organic solvent is exemplified, for example, by propylene glycol (hereinafter referred to as "PG", in some cases: vapor pressure at 20° C.: 10.6 Pa), 1,3-butanediol (vapor pressure at 20° C.: 8 Pa), ethylene glycol (hereinafter referred to as "EG", in some cases; vapor pressure at 20° C.: 7 Pa), etc. Each of these water-soluble organic solvents may function as a humectant which prevents the water-based ink from drying at an end of a nozzle in an ink-jet head.

Only one kind of the first water-soluble organic solvent as described above may be used singly, or two or more kinds of the first water-soluble organic solvent as described above may be used in combination. A content amount (A) of the first water-soluble organic solvent in the entire amount of the water-based ink will be described later on.

Vapor pressure at 20° C. of the second water-soluble organic solvent is not more than 1 Pa. The second water-soluble organic solvent is exemplified, for example, by tripropylene glycol (hereinafter referred to as "TPG", in some cases; vapor pressure at 20° C.: 0.67 Pa), diethylene glycol (hereinafter referred to as "DEG", in some cases; vapor pressure at 25° C.: 0.76 Pa), glycerol (hereinafter referred to as "GLY", in some cases; vapor pressure at 25° C.: 0.01 Pa), 1,5-pentanediol (vapor pressure at 25° C.: 0.52 Pa), triethylene glycol-n-butyl ether (hereinafter referred to as "BTG" in some cases; vapor pressure at 25° C.: 0.33 Pa), tripropylene glycol n-butyl ether (hereinafter referred to as "TPnB" in some cases; vapor pressure at 20° C.: 0.02 Pa), etc. The vapor pressures of DEG, GLY, 1,5-pentanediol, BTG listed above indicate the vapor pressures thereof, respectively, at 25° C. However, since the vapor pressures of these second water-soluble organic solvents at 20° C. are smaller than those at 25° C., the vapor pressure of these second water-soluble organic solvents are not more than 1 Pa at 20° C. Among the above-listed second water-soluble organic solvents, the TPG, DEG, GLY and 1,5-pentanediol may function, for example, as the humectant. Further, among the above-listed second water-soluble organic solvents, the BTG and TPnB may function, for example, as a penetrant which adjusts spreading of the water-based ink on the recording medium and/or the drying velocity of the water-based ink on the recording medium.

Only one kind of the second water-soluble organic solvent as described above may be used singly, or two or more kinds of the second water-soluble organic solvent as described above may be used in combination. A content amount (B) of the second water-soluble organic solvent in the entire amount of the water-based ink will be described later on.

The water-soluble organic solvent included in the water-based ink may be only the first water-soluble organic solvent and the second water-soluble organic solvent as described above. Further, the water-based ink may further include another water-soluble organic solvent, in addition to the first and second water-soluble organic solvents, which is different from the first and second water-soluble organic solvents.

The water is preferably ion-exchanged water or pure water (purified water). The content amount of the water in the entire amount of the water-based ink is, for example, in a range of 20% by mass to 80% by mass. The content amount of the water may be, for example, a balance of the other components.

The solid component includes at least one resin selected from the group consisting of: acrylic acid-based resin, maleate ester-based resin, vinyl acetate-based resin, carbonate-based resin, styrene-based resin, ethylene-based resin, propylene-based resin, urethane-based resin, vinyl chloride-based resin and copolymer resin thereof. Only one kind of the resin as described above may be used singly, or two or more kinds of the resin as described above may be used in combination.

The resin may include resin minute particles (resin fine particles). Namely, the water-based ink may contain the resin minute particles as the resin. The glass-transition temperature (Tg) of the resin minute particles is, for example, not more than 100° C. The resin minute particles may be, for example, resin minute particles included in a resin emulsion. The term "resin emulsion" means a resin emulsion composed, for example, of the resin minute particles and a disperse medium (for example, water, etc.); in the resin emulsion, the resin minute particles are dispersed with a specific particle diameter (particle size) in the disperse medium, rather than in a dissolved state in the disperse medium. In the present specification, the resin minute particles included in the resin emulsion are defined as "emulsion particles". The water-based ink of the present embodiment may include the emulsion particles as a solid component thereof. The emulsion particles preferably include an acrylic resin (acrylic acid-based resin), a styrene-acrylic resin (copolymer of styrene-based resin and acrylic acid-based resin), a urethane resin (urethane-based resin) or a vinyl chloride-acrylic-based copolymer (copolymer of vinyl chloride-based resin and acrylic acid-based resin). Only one kind of the emulsion particles as described above may be used singly, or two or more kinds of the emulsion particles as described above may be used in combination.

As the resin emulsion, it is allowable to use, for example, a commercially available product. The commercially available product is exemplified, for example, by "MOWINYL (trade name) 6969D" (acrylic resin emulsion) (Tg: 71° C.), "MOWINYL (trade name) 5450" (Tg: 53° C.) and "MOWINYL (trade name) DM772" (Tg: 22° C.) produced by JAPAN COATING RESIN CO., LTD.; "POLYSOL (trade name) AP-3770 (styrene-acrylic resin emulsion) produced by SHOWA DENKO K.K.; "SUPERFLEX (trade name) 150" (urethane resin emulsion) (Tg: 40° C.) produced by DKS CO., LTD. (DAI-ICHI KOGYO SEIYAKU CO., LTD.); VINYBLAN (trade name) 701 (vinyl chloride-acrylic-based copolymer emulsion) produced by NISSIN CHEMICAL CO., LTD.; etc.

The mean (average) particle diameter (size) of the resin minute particles is, for example, in a range of 20 nm to 300 nm. The mean particle diameter can be measured, for example, by using a dynamic light scattering particle diameter distribution measuring apparatus "LB-550" (product name) produced by HORIBA. LTD., as the arithmetic mean diameter. The mean particle diameter may be a mean particle diameter (intensity mean particle diameter) calculated based on an intensity-based particle size distribution (light scattering intensity-based particle size distribution).

The content amount of the resin minute particles in the entire amount of the water-based ink is, for example, in a range of 1% by mass to 10% by mass. One kind of the resin minute particles described above may be used singly, or two or more kinds of the resin minute particles as described above may be used in combination.

The water-based ink may be a chromatic ink including a colorant, or may be achromatic (colorless) ink not including any colorant. In the chromatic ink, the colorant may be either one of a pigment and a dye. Further, as the colorant, the pigment and the dye may be mixed and used as the colorant.

The pigment is not particularly limited, and may be exemplified, for example, by carbon black, an inorganic pigment, an organic pigment, etc. The carbon black is exemplified, for example, by furnace black, lamp black, acetylene black, channel black, etc. The inorganic pigment is exemplified, for example, by titanium oxide, iron oxide-based inorganic pigments, carbon black-based inorganic pigments, etc. The organic pigment is exemplified, for example, by azo-pigments such as azo lake, insoluble azo-pigment, condensed azo-pigment, chelate azo-pigment, etc.; polycyclic pigments such as phthalocyanine pigment, perylene and perynon pigments, anthraquinone pigment, quinacridone pigment, dioxadine pigment, thioindigo pigment, isoindolinone pigment, quinophthalone pigment, etc.; dye lake pigments such as basic dye type lake pigment, acid dye type lake pigment, etc.; nitro pigments; nitroso pigments; aniline black daylight fluorescent pigment; etc. Further, it is also allowable to use, as the pigment, any pigment different from those listed above and dispersible in water phase. Specific examples of these pigments include, for example, C. I. Pigment Blacks 1, 6, and 7; C. I. Pigment Yellows 1, 2, 3, 12, 13, 14, 15, 16, 17, 55, 74, 78, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 209, 221, 222, 224, and 238. C. I. Pigment Violets 19 and 196; C. I. Pigment Blues 1, 2, 3, 15, 15:1, 15:2, 15:3, 15:4, 16, 22, and 60; C. I. Pigment Greens 7 and 36; and solid solutions of the above-listed pigments. The water-based ink related to the present disclosure may be prepared by dispersing the pigment in water with a dispersant. As the dispersant, it is allowable to use, for example, a general polymeric dispersant (resin for dispersing pigment or resin-dispersing pigment, resin dispersant), etc., and may be prepared in-house. Alternatively, in the water-based ink related to the present disclosure, the pigment may be subjected to polymer capsulation.

The pigment may be a self-dispersible pigment. The self-dispersible pigment is dispersible in water without using any dispersant, for example, owing to the fact that at least one of a hydrophilic functional group and the salt thereof including, for example, carbonyl group, hydroxyl group, carboxylic acid group, sulfonic acid group (sulfonate group), phosphoric acid group (phosphate group), etc., is introduced into the surfaces of the particles of the pigment by the chemical bond directly or with any group intervening therebetween. It is possible to use self-dispersible pigments subjected to the surface treatment by any one of methods described, for example, in Japanese Patent Application Laid-open No. HEI8-3498 corresponding to U.S. Pat. No. 5,609, 671, Published Japanese Translation of PCT International Publication for Patent Application No. 2000-513396 corresponding to U.S. Pat. No. 5,837,045, Published Japanese Translation of PCT International Publication for Patent Application No. 2008-524400 corresponding to United States Patent Application Publication No. US 2006/0201380 A1, Published Japanese Translation of PCT International Publication for Patent Application No. 2009-515007 corresponding to United States Patent Application Publications No. US 2007/0100023 A1 and No. US 2007/0100024 A1, Published Japanese Translation of PCT International Publication for Patent Application No. 2011-515535 corresponding to United States Patent Application Publications No. US 2009/0229489 A1, etc. It is possible to use, as a material for the self-dispersible pigment, either one of the inorganic pigment and the organic pigment. Further, a pigment which is suitable for the above-described treatment includes, for example, carbon black such as "MA8" and "MA100" produced by MITSUBISHI CHEMICAL CORPORATION, etc. As the self-dispersible pigment, it is possible, for example, to use a commercially available product. The commercially available product includes, for example, "CAB-O-JET (trade name) 200", "CAB-O-JET (trade name) 250C", "CAB-O-JET (trade name) 260M", "CAB-O-JET (trade name) 270Y", "CAB-O-JET (trade name) 300", "CAB-O-JET (trade name) 400", "CAB-O-JET (trade name) 450C", "CAB-O-JET (trade name) 465M" and "CAB-O-JET (trade name) 470Y" produced by CABOT SPECIALTY CHEMICALS; "BONJET (trade name) BLACK CW-2" and "BONJET (trade name) BLACK CW-3" produced by ORIENT CHEMICAL INDUSTRIES, LTD., "LIOJET (trade name) WD BLACK 002C" produced by TOYO INK MFG. CO., LTD.; etc.

The solid content amount of the pigment (pigment solid content amount) in the entire amount of the water-based ink is not particularly limited, and may be appropriately determined based on, for example, a desired optical density, chromaticness, etc. The pigment solid content amount is, for example, in a range of 0.1% by mass to 20% by mass, in a range of 1% by mass to 15% by mass, or in a range of 2% by mass to 10% by mass.

The pigment and the resin for dispersing pigment (resin dispersant) correspond to the solid component.

The dye is not specifically limited, and is exemplified, for example, by a direct dye, an acidic dye, a basic dye, a reactive dye, a food dye, etc. Specific examples of the dye include, for example, C. I. Direct Black, C. I. Direct Blue, C. I. Direct Red, C. I. Direct Yellow, C. I. Direct Orange, C. I. Direct Violet, C. I. Direct Brown, C. I. Direct Green; C. I. Acid Black. C. I. Acid Blue, C. I. Acid Red, C. I. Acid Yellow, C. I. Acid Orange, C. I. Acid Violet; C. I. Basic Black, C. I. Basic Blue, C. I. Basic Red, C. I. Basic Violet; C. I. Reactive Blue, C. I. Reactive Red, C. I. Reactive Yellow; C. I. Food Black, C. I. Food Red, C. I. Food Yellow; etc. C. I. Direct Black described above is exemplified, for example, by C. I. Direct Blacks 17, 19, 22, 31, 32, 51, 62, 71, 74, 108, 112, 113, 146, 154, 168, 195, etc. C. I. Direct Blue described above is exemplified, for example, by C. I. Direct Blues 1, 6, 15, 22, 25, 41, 71, 76, 77, 80, 86, 90, 98, 106, 108, 120, 158, 163, 168, 199, 226, etc. C. I. Direct Red described above is exemplified, for example, by C. I. Direct Reds 1, 2, 4, 9, 11, 17, 20, 23, 24, 28, 31, 39, 46, 62, 75, 79, 80, 83, 89, 95, 197, 201, 218, 220, 224, 225, 226, 227, 228, 229, 230, etc. C. I. Direct Yellow described above is exemplified, for example, by C. I. Direct Yellows 8, 11, 12, 24, 26, 27, 28, 33, 39, 44, 50, 58, 85, 86, 87, 88, 89, 98, 100, 110, 132, 142, 173, etc. C. I. Direct Orange described above is exemplified, for example, by C. I. Direct Oranges 34, 39, 44, 46, 60, etc. C. I. Direct Violet described above is exemplified, for example, by C. I. Direct Violets 47, 48, etc. C. I. Direct Brown described above is exemplified, for example, by C. I. Direct Brown 109, etc. C. I. Direct Green described above is exemplified, for example, by C. I. Direct Green 59, etc. C. I. Acid Black described above is exemplified, for example, by C. I. Acid Blacks 2, 7, 24, 26, 31, 48, 51, 52, 63, 110, 112, 115, 118, 156, etc. C. I. Acid Blue described above is exemplified, for example, by C. I. Acid Blues 1, 7, 9, 15, 22, 23, 25, 29, 40, 43, 59, 62, 74, 78, 80, 90, 93, 100, 102, 104, 117, 120, 127, 138, 158, 161, 167, 220, 234, etc. C. I. Acid Red described above is exemplified, for example, by C. I. Acid Reds 1, 6, 8, 9, 13, 14, 18, 26, 27, 32, 35, 37, 42, 51, 52, 80, 83, 85, 87, 89, 92, 94, 106, 114, 115, 133, 134, 145, 158, 180, 198, 249, 256, 265, 289, 315, 317, etc. C. I. Acid Yellow described above is exemplified, for example, by C. I. Acid Yellows 1, 3, 7, 11, 17, 23, 25, 29, 36, 38, 40, 42, 44, 61, 71, 76, 98, 99, etc. C. I. Acid Orange described above is exemplified, for example, by C. I. Acid Oranges 7, 19, etc. C. I. Acid Violet described above is exemplified, for example, by C. I. Acid Violet 49, etc. The C. I. Basic Black is exemplified, for example, by C. I. Basic Black 2, etc. The C. I. Basic Blue is exemplified, for example, by C. I. Basic Blues 1, 3, 5, 7, 9, 24, 25, 26, 28, 29, etc. The C. I. Basic Red is exemplified, for example, by C. I. Basic Reds 1, 2, 9, 12, 13, 14, 37, etc. The C. I. Basic Violet is exemplified, for example, by C. I. Basic Violets 7, 14, 27, etc. C. I. Reactive Blue described above is exemplified, for example, by C. I. Reactive Blues 4, 5, 7, 13, 14, 15, 18, 19, 21, 26, 27, 29, 32, 38, 40, 44, 100, etc. C. I. Reactive Red described above is exemplified, for example, by C. I. Reactive Reds 7, 12, 13, 15, 17, 20, 23, 24, 31, 42, 45, 46, 59, etc. C. I. Reactive Yellow described above is exemplified, for example, by C. I. Reactive Yellows 2, 3, 17, 25, 37, 42, etc. C. I. Food Black described above is exemplified, for example, by C. I. Food Blacks 1, 2, etc. C. I. Food Red described above is exemplified, for example, by C. I. Food Reds 87, 92, 94, etc. C. I. Food Yellow described above is exemplified, for example, by C. I. Food Yellow 3, etc.

It is allowable that one kind of the dye as described above is used singly, or two or more kinds of the dye are used in combination. The content amount of the dye in the entire amount of the water-based ink is, for example, in a range of 0.1% by mass to 20% by mass, in a range of 1% by mass to 15% by mass, or in a range of 2% by mass to 10% by mass. The dye corresponds to the solid component.

The water-based ink may further include a conventionally known additive, as necessary. The additive is exemplified, for example, by pH-adjusting agents, viscosity-adjusting agents, surface tension-adjusting agents, fungicides, etc. The viscosity-adjusting agents are exemplified, for example, by polyvinyl alcohol, cellulose, water-soluble resin, etc. An additive which is liquid (in a liquid state) at 20° C. corresponds to the above-described liquid component. A content amount (C) of a component included in the liquid component and different from the first water-soluble organic solvent, the second water-soluble organic solvent and the water will be described later on. The water-based ink may include a surfactant which is liquid (in a liquid state) at 20° C. Further, an additive which is solid (in a solid state) at 20° C. corresponds to the above-described solid component. The water-based ink may include a surfactant which is in a solid state at 20° C.

The water-based ink can be prepared, for example, by uniformly mixing the liquid component, the solid component, and an optionally other additive(s) as necessary, by a conventionally known method, and then removing any non-dissolved matter, with a filter, etc.

The water-based ink satisfies the following conditions (1) and (2). The water-based ink contains the liquid component, the solid component so as to satisfy the following conditions (1) and (2) to thereby make it possible to suppress any clogging of nozzle and to realize a satisfactory drying state on a recording medium, and to further enhance the flexibility and expansibility, the anti-scratching (anti-rubbing or anti-abrasion) and blocking property of a recorded item (recorded matter).

$$2 \le (A + B + C)/D \le 6 \qquad \text{Condition (1)}$$

$$0.2 \le (B + C)/D \le 1 \qquad \text{Condition (2)}$$

wherein in the conditions (1) and (2).

A: the content amount (% by mass) of the first water-soluble organic solvent in the entire amount of the water-based ink, B: the content amount (% by mass) of the second water-soluble organic solvent in the entire amount of the water-based ink, C: the content amount (% by mass) of a component included in the liquid component and different from the first water-soluble organic solvent, the second water-soluble organic solvent and the water in the entire amount of the water-based ink, and D: the content amount (% by mass) of the solid component in the entire amount of the water-based ink.

It is allowable to appropriately adjust each of the content amount (A) (% by mass) of the first water-soluble organic solvent, the content amount (B) (% by mass) of the second water-soluble organic solvent, the content amount (C) (% by mass) of the component included in the liquid component and different from the first water-soluble organic solvent, the second water-soluble organic solvent and the water, and the content amount (D) (% by mass) of the solid component, so as to satisfy the above-described conditions (1) and (2).

Further, the water-based ink preferably satisfies the following condition (3). By satisfying the condition (3), the water-based ink is capable of suppressing the clogging of nozzles, of realizing a satisfactory drying state on the recording medium, and further of enhancing the flexibility and expansibility, the anti-scratching and blocking property of a recorded matter (recorded item).

$$10 \le A + B \le 40 \qquad \text{Condition (3)}$$

wherein in the condition (3),

A: the content amount (% by mass) of the first water-soluble organic solvent in the entire amount of the water-based ink, and B: the content amount (% by mass) of the second water-soluble organic solvent in the entire amount of the water-based ink.

Further, a ratio (A/B) of the content amount (A: % by mass) of the first water-soluble organic solvent in the entire amount of the water-based ink to the content amount (B: % by mass) of the second water-soluble organic solvent in the entire amount of the water-based ink is preferably in a range of 1 to 30. By making the ratio (A/B) to be within the range of 1 to 30, it is possible to suppress the clogging of nozzles, to realize a satisfactory drying state on the recording medium, and to further enhance the flexibility and expansibility, the anti-scratching and blocking property of a recorded matter.

In the condition (1), (A+B+C) is the content amounts (% by mass) of the components, which are included in the liquid component and which are different from the water, in the entire amount of the water-based ink. In a case that the ratio ((A+B+C)/D) of the content amounts of the components which are included in the liquid component and which are different from the water to the solid component is great, the clogging of nozzles is less likely to occur. On the other hand, in a case that the ratio ((A+B+C)/D) of the content amounts of the components which are included in the liquid component and which are different from the water to the solid component is small, it is possible to promote drying on the recording medium. Accordingly, in a case that the value of (A+B+C)/D is not less than 2, the clogging of nozzles can be suppressed. On the other hand, in a case that the value of (A+B+C)/D is not more than 6, a satisfactory drying state on the recording medium can be realized.

Further, in a case that the value of (A+B+C)/D is not less than 3, the clogging of nozzles can be further suppressed. On the other hand, in a case that the value of (A+B+C)/D is not more than 5, a more satisfactory drying state on the recording medium can be realized. Accordingly, it is further preferred that the water-based ink satisfies the following condition (4). By satisfying the condition (4), the water based-ink is capable of further suppressing the clogging of nozzles and of realizing a further satisfactory drying state on the recording medium.

$$3 \le (A + B + C)/D \le 5 \qquad \text{Condition (4)}$$

wherein in the condition (4),

A: the content amount (% by mass) of the first water-soluble organic solvent in the entire amount of the water-based ink, B: the content amount (% by mass) of the second water-soluble organic solvent in the entire amount of the water-based ink, C: the content amount (% by mass) of a component included in the liquid component and different from the first water-soluble organic solvent, the second water-soluble organic solvent and the water in the entire amount of the water-based ink, and D: the content amount (% by mass) of the solid component in the entire amount of the water-based ink.

In the condition (2), (B+C) is the content amounts (% by mass) of the components which are included in the liquid component and which are different from the water and the first water-soluble organic solvent, in the entire amount of the water-based ink. In a case that the ratio ((B+C)/D) of the content amounts of the components which are included in the liquid component which are different from the water and the first water-soluble organic solvent to the solid component is great, then even in a case that a recorded matter having an image recorded thereon is bent, the image of the recorded matter is less likely to be disturbed. Namely, the flexibility and expansibility of the recorded matter can be made satisfactory. On the other hand, in a case that the ratio ((B+C)/D) of the content amounts of the components, which are included in the liquid component and which are different from the water and the first water-soluble organic solvent, to the solid component is small, the anti-scratching and blocking property of a recorded matter are enhanced. Accordingly, in a case that the value of (B+C)/D is not less than 0.2, the flexibility and expansibility of the recorded matter can be enhanced. On the other hand, in a case that the value of (B+C)/D is not more than 1.0, the anti-scratching and blocking property of a recorded matter are enhanced.

Further, in a case that the value of (B+C)/D is not less than 0.3, the flexibility and expansibility of the recorded matter can be further enhanced. Furthermore, in a case that the value of (B+C)/D is not more than 0.8, the anti-scratching and blocking property of a recorded matter can be further enhanced. Accordingly, it is further preferred that the water-based ink satisfies the following condition (5). By satisfying the condition (5), the water based-ink is capable of further enhancing the flexibility and expansibility of the recorded matter and to further enhancing the anti-scratching and blocking property of the recorded matter.

$$0.3 \le (B + C)/D \le 0.8 \qquad \text{Condition (5)}$$

wherein in the condition (5),

B: the content amount (% by mass) of the second water-soluble organic solvent in the entire amount of the water-based ink, C: the content amount (% by mass) of a component included in the liquid component and different from the first water-soluble organic solvent, the second water-soluble organic solvent and the water in the entire amount of the water-based ink, and D: the content amount (% by mass) of the solid component in the entire amount of the water-based ink.

Next, an ink-jet recording apparatus and an ink-jet recording method related to the present disclosure will be explained.

The ink-jet recording apparatus related to the present disclosure is an ink-jet recording apparatus characterized by including: an ink storing part (ink storage), and an ink discharging mechanism (ink jetting mechanism, ink-jet head); and being configured to discharge an ink stored in the ink storing part by the ink discharging mechanism; wherein the water-based ink for ink-jet recording related to the present disclosure is stored in the ink storing part. As will be described later on, the ink-jet recording apparatus related to the present disclosure may further include a drying mechanism configured to dry a recording portion or recording part recorded by using the ink.

The ink-jet recording method related to the present disclosure is characterized by including: a recording step of performing recording on a recording medium by jetting (by discharging) a water-based ink onto the recording medium in accordance with an ink-jet system; wherein the water-based ink for ink-jet recording related to the present disclosure is used as the water-based ink in the recording step. The ink-jet recording method related to the present disclosure may further include a fixing step of fixing the water-based ink to the recording medium by use of a drying mechanism configured to dry a recording part of the recording medium.

The ink-jet recording method related to the present disclosure can be performed, for example, by using the ink-jet recording apparatus related to the present disclosure. The recording includes printing a letter (text), printing an image, printing, etc.

FIG. 1 schematically depicts an exemplary configuration of the ink-jet recording apparatus related to the present disclosure. As depicted in FIG. 1, an ink-jet recording apparatus 100 includes a feed tray 101, a conveyance mechanism (not depicted) such as a roller, recording mechanisms 102A and 102B, a platen 103, a drying mechanism 104, a discharge tray 105, and ink storing sections (not depicted) such as ink cartridges or ink tanks. The feed tray 101 can support a plurality of pieces of a recording medium P (e.g., a plurality of pieces of coated paper sheet) stacked thereon.

The recording mechanism includes a carriage 102A and an ink-jet head (ink jetting mechanism) 102B. The carriage 102A is supported by two guide rails (not depicted) extending orthogonally with respect to a conveyance direction of the recording medium P. The two guide rails are supported by a casing (not depicted) of the ink-jet recording apparatus 100. The carriage 102A is connected to a well-known belt mechanism (not depicted) provided in the two guide rails. The belt mechanism is driven by a carriage motor (not depicted). The carriage motor is driven to thereby cause the carriage 102A connected to the belt mechanism to reciprocate (move reciprocatingly) in an orthogonal direction which is orthogonal with respect to the conveyance direction of the recording medium P.

Further, four ink tubes (not depicted) connecting the ink storing sections and the ink-jet head 102B, and a flexible flat cable (not depicted) electrically connecting a control board (not depicted) and the ink-jet head 102B extend from the carriage 102A. Four colors of water-based inks (yellow, magenta, cyan, and black) stored in the ink storing sections are supplied to the ink-jet head 102B via the four ink tubes. At least one of the four water-based inks is the water-based ink for ink-jet recording related to the present disclosure. A control signal outputted from the control board is transmitted to the ink-jet head 102B via the flexible flat cable.

As depicted in FIG. 1, the carriage 102A has the ink-jet head 102B mounted or installed therein. A plurality of nozzles 102C are formed in a lower surface of the ink-jet head 102B. A front end of each of the plurality of nozzles 102C is exposed from the carriage 102A and the lower surface of the ink-jet head 102B. The ink-jet head 102B includes an actuator (not depicted) which applies force for jetting the water-based ink which is supplied from the ink storing section to the ink-jet head 102B via the ink tube. The actuator may be an actuator of any system, such as a piezoelectric element system, a thermal ink-jet system, an electrostatic attraction system, etc. The ink-jet head 102B jets or discharges the water-based ink, as fine or minute ink droplets of the water-based ink, from the plurality of nozzles 102C during a process in which the carriage 102A reciprocates in the orthogonal direction orthogonal with respect to the conveyance direction of the recording medium P. With this, an image is recorded on the recording medium P. The ink-jet recording apparatus 100 may have a cap (not depicted) which covers the plurality of nozzles 102C of the ink-jet head 102 which is returned to a rest position in a case that a recording is finished. The platen 103 is arranged so as to face the recording mechanism, and supports the recording medium P conveyed from the feed tray 101.

The drying mechanism 104 heats and dries a recording part of the recording medium P. The drying temperature during the drying can be adjusted as appropriate by changing the setting of the drying mechanism 104. Specifically, the drying temperature may be, for example, in a range of 20° C. to 200° C. or in a range of 50° C. to 100° C. The drying time may be also adjusted as appropriate by changing the setting of the drying mechanism 104. For example, the drying time may be in a range of a second(s) exceeding 0 (zero) seconds to not more than 300 seconds, in a range of 0.1 seconds to 60 seconds, or in a range of 30 seconds to 60 seconds. Any drying mechanism which is capable of drying the recording part may be used as the drying mechanism 104. Examples of the drying mechanism 104 include, for example, heating mechanisms such as commercially available dryers, IR heaters, ovens, belt conveyer ovens, irons, hot presses, etc. A non-contact drying mechanism, such as the drier, the oven, the belt conveyer oven, etc., which dries the recording part of the recording medium P without contacting with the recording part is preferably used.

The recording medium P after recording and drying is conveyed to the discharge tray 105.

EXAMPLES

Next, Examples of the present disclosure are explained together with Comparative Examples. Note that the present disclosure is not limited to and restricted by Examples and Comparative Examples described below.

<Preparation of Black Pigment Dispersion Liquid>

135 g of Terathane (trade name) 650 (polyether diol produced by INVISTA (Wichita, KS), 54 g of 2,2'-dimethylolpropionic acid (DMPA), 132 g of sulfolane and 0.06 g of dibutyltin dilaurate (DBTDL) were added to a flask provided with a dropping funnel, a condenser and an agitator (stirring device) under an atmosphere of nitrogen, then were heated up to 60° C. while being mixed, and then were mixed sufficiently; thus, a mixture was obtained. To the obtained mixture, 164 g of m-tetramethylene xylylenediisocyanate (TMXDI) was added with the dropping funnel, and remaining TMXDI in the dropping funnel was rinsed with 15 g of sulfolane into the flask. The temperature was raised up to 100° C., and was maintained at 100° C. until the content rate of isocyanate reached to be not more than 1.3% by mass. Next, the temperature was lowered up to 60° C., then 12.9 g of diethanolamine (DEA) was added to the mixture over 5 (five) minutes with the dropping funnel, and the temperature was maintained at 60° C. until remaining DEA in the dropping funnel was rinsed with 5 g of sulfolane into the flask. Furthermore, the temperature was maintained at 60° C. for one hour, then 376 g of a 3% by mass aqueous solution of potassium hydroxide was added to the mixture over 10 (ten) minutes with the dropping funnel, then 570 g of deionized water was further added to the mixture. Then, the temperature was maintained at 60° C. for one hour, and cooling to the room temperature was performed. Thus, a resin dispersant with 24% by mass of solid content was obtained.

<Preparation of Black Pigment Dispersion Liquid>

The resin dispersant was neutralized with potassium hydroxide in order to increase the solubility in water and to make the resin dispersant to easily dissolve to water. Then, a microfluidizer of high-pressure compressed air system (Model name: M-110Y, produced by MICROFLUIDICS (Newton, Massachusetts) was used so as to produce a mixture in which content amount of carbon black (C.I. Pigment Black 7) was approximately 27% by mass and the mass ratio (P/D) of the content amount (P) of the carbon black to the content amount (D) of the resin dispersant was P/D=3. Then, deionized water was added to the mixture so that the content amount of the carbon black was made to be approximately 24% by mass for the suitable medium mill grinding condition; and the mixture was milled (pulverized) for 4 (four) hours. After the milling, the deionized water was added, and the mixture was mixed sufficiently. Then, after any impurity was filtered and removed, dilution with deionized water was performed so that the content amount of the carbon black was made to be 15% by mass; thus, a black pigment dispersion liquid was obtained.

<Preparation of Blue Pigment Dispersion Liquid>

The resin dispersant was neutralized with potassium hydroxide in order to increase the solubility in water and to make the resin dispersant to easily dissolve to water. Then, an Eiger Minimill of the bead mill system (Model name: M250, produced by VSE EXP, EIGER MACHINERY INC. (Chicago, Illinois) was used so as to produce a mixture in which content amount of a blue pigment (C.I. Pigment Blue 15:3) was approximately 27% by mass and the mass ratio (P/D) of the content amount (P) of the blue pigment to the content amount (D) of the resin dispersant was P/D=3. Then, deionized water was added to the mixture so that the content amount of the blue pigment was made to be approximately 18% by mass for the suitable medium mill grinding condition; and the mixture was milled (pulverized) for 4 (four)

hours. After the milling, the deionized water was added, and the mixture was mixed sufficiently. Then, after any impurity was filtered and removed, dilution with deionized water was performed so that the content amount of the blue pigment was made to be 15% by mass; thus, a blue pigment dispersion liquid was obtained.

<Preparation of Blue Pigment Dispersion Liquid>

A red pigment dispersion liquid was obtained similarly to the above-described preparation of the blue pigment dispersion liquid, except that a red pigment (C.I. Pigment Red 122) was used instead of the blue pigment.

<Preparation of Yellow Pigment Dispersion Liquid>

The resin dispersant was neutralized with potassium hydroxide in order to increase the solubility in water and to make the resin dispersant to easily dissolve to water. Then, an Eiger Minimill of the bead mill system (Model name: M250, produced by VSE EXP, EIGER MACHINERY INC. (Chicago, Illinois) was used so as to produce a mixture in which content amount of a yellow pigment (C.I. Pigment Yellow 74) was approximately 30% by mass and the mass ratio (P/D) of the content amount (P) of the yellow pigment to the content amount (D) of the resin dispersant was P/D=5. Then, deionized water was added to the mixture so that the content amount of the yellow pigment was made to be approximately 20% by mass for the suitable medium mill grinding condition; and the mixture was milled (pulverized) for 4 (four) hours. After the milling, the deionized water was added, and the mixture was mixed sufficiently. Then, after any impurity was filtered and removed, dilution with deionized water was performed so that the content amount of the yellow pigment was made to be 15% by mass; thus, a yellow pigment dispersion liquid was obtained.

Examples 1 to 7 and 9, and Comparative Examples 1 to 4

Ingredients or components, except for the pigment dispersion liquid, which were included in Water-based ink composition (TABLE 1) were mixed uniformly or homogeneously; and thus an ink solvent was obtained. Subsequently, the ink solvent was added to the pigment dispersion liquid, followed by being mixed uniformly, and thus a mixture was obtained. After that, the obtained mixture was filtrated through a cellulose acetate membrane filter (pore size 3.00 μm) produced by TOYO ROSHI KAISHA, LTD., and thus the water-based ink for ink-jet recording in each of Examples 1 to 7 and 9, and Comparative examples 1 to 4 as indicated in TABLE 1 was obtained.

Example 8

Ingredients or components, except for the pigment dispersion liquid, which were included in Water-based ink composition (TABLE 1) were mixed uniformly or homogeneously, and thus a mixture was obtained. After that, the obtained mixture was filtrated through a polytetrafluoroethylene (PTFE) membrane filter (pore size 0.20 μm) produced by TOYO ROSHI KAISHA, LTD., and thus the water-based ink for ink-jet recording in Example 8 as indicated in TABLE 1 was obtained. The water-based ink of Example 8 is a colorless or achromatic ink (clear ink) not including any colorant.

With respect to the water-based inks of Examples 1 to 9 and Comparative examples 1 to 4, (a) evaluation of clogging of nozzle, (b) evaluation of drying property, (c) evaluation of flexibility and expansibility, and (d) evaluation of anti-scratching property and blocking property were conducted by the following methods.

(a) Evaluation of Clogging of Nozzle

After an ink-jet printer MFC-J4225N, produced by BROTHER KOGYO KABUSHIKI KAISHA, was left to stand for a predetermined period of time in a state that an ink-jet head thereof was uncapped, the water-based ink of each of Examples 1 to 9 and Comparative Examples 1 to 4 was discharged from the ink-jet printer MFC-J4225N, and the clogging of nozzle was evaluated based on the following evaluation criterion.

<Evaluation of Clogging of Nozzle: Evaluation Criterion>

AA: The water-based ink was discharged without any problem from the ink-jet head which had been left to stand in the uncapped state for 30 (thirty) minutes.

A: Although the water-based ink was discharged with a problem from the ink-jet head which had been left to stand in the uncapped state for 30 (thirty) minutes, the ink was discharged without any problem from the ink-jet head which had been left to stand in the uncapped state for 15 (fifteen) minutes.

B: The water-based ink was discharged with a problem from the ink-jet head which had been left to stand in the uncapped state for 15 (fifteen) minutes.

(b) Evaluation of Drying Property

The above-described ink-jet printer MFC-J4225N was used to record an image on coated paper (product name; "OK Top Coat Plus", produced by Oil PAPER CO., LTD.) by using each of the water-based inks of Examples 1 to 9 and Comparative Examples 1 to 4. Each of the images recorded with one of the water-based inks of Examples 1 to 9 and Comparative Examples 1 to 4 was dried while changing the drying condition, and the quick drying property was evaluated in accordance with the following evaluation criterion.

<Evaluation of Drying Property: Evaluation Criterion>

AA: The water-based ink was dried under a condition of temperature: 100° C. and drying time: 60 (sixty) seconds.

A: Although the water-based ink was not dried under the condition of temperature: 100° C. and drying time: 60 (sixty) seconds, the water-based ink was dried under a condition of temperature: 100° C. and drying time: 120 (one hundred and twenty) seconds.

B: The water-based ink was not dried under the condition of temperature: 100° C. and drying time: 120 (one hundred and twenty) seconds.

(c) Evaluation of Flexibility and Expansibility

The above-described ink-jet printer MFC-J4225N was used to record an image on coated paper (product name: "OK Top Coat Plus", produced by OJI PAPER CO., LTD.) by using each of the water-based inks of Examples 1 to 9 and Comparative Examples 1 to 4 so as to obtain a recorded matter having the image recorded thereon. Each of the recorded matters recorded with one of the water-based inks of Examples 1 to 9 and Comparative Examples 1 to 4 was bent, and the flexibility and expansibility were evaluated in accordance with the following evaluation criterion.

<Evaluation of Flexibility and Expansibility: Evaluation Criterion>

AA: Even in a case that the recorded matter was bent, the image was not disturbed.

A: In a case that the recorded matter was bent, although the water-based ink was not peeled off (separated) from the recorded matter, a slightly cracked part was observed.

B: In a case that the recorded matter was bent, a part from which the water-based ink was peeled off (separated) slightly from the recorded matter was observed.

(d) Evaluation of Anti-Scratching and Blocking Property

The above-described ink-jet printer MFC-J4225N was used to record an image on coated paper (product name: "OK Top Coat Plus", produced by OJI PAPER CO., LTD.) by using each of the water-based inks of Examples 1 to 9 and Comparative Examples 1 to 4 so as to obtain a recorded matter having the image recorded thereon. Each of the recorded matters recorded with one of the water-based inks of Examples 1 to 9 and Comparative Examples 1 to 4 was touched by a finger, and the anti-scratching and blocking property were evaluated in accordance with the following evaluation criterion.

<Evaluation of Anti-Scratching and Blocking Property: Evaluation Criterion>

AA: Even in a case that the image on the recorded matter was touched by a finger, there was no sticky sensation.

A: In a case that the image on the recorded matter was touched by a finger, although there was a slightly sticky sensation, the water-based ink did not transfer to the finger.

B: In a case that the image on the recorded matter was touched by a finger, there was a sticky sensation, and the water-based ink slightly transferred to the finger.

The water-based ink compositions and the evaluation results of the above-described evaluations (a) to (d) in Examples 1 to 9 and Comparative Examples 1 to 4 are indicated in TABLE 1 as follows.

TABLE 1

| | | | Examples | | | | |
|---|---|---|---|---|---|---|---|
| | | | 1 | 2 | 3 | 4 | 5 |
| Water-based ink composition (% by mass) | First water-soluble organic solvent (A) | PG | 30.0 | 10.0 | 10.0 | 32.0 | 36.0 |
| | | 1,3-butanediol | — | 9.4 | — | — | — |
| | | EG | — | — | 2.0 | — | — |
| | Second water-soluble organic solvent (B) | TPG | 3.0 | 2.2 | 8.0 | 3.0 | — |
| | | DEG | — | — | — | 1.0 | — |
| | | GLY | — | — | — | — | — |
| | | 1,5-pentanediol | — | — | — | — | 1.5 |
| | | BTG | — | — | 1.0 | — | — |
| | | TPnB | — | — | — | — | — |
| | Resin minute particles (D) | MOWINYL (trade name) 6969D (*1) | 5.0 | — | — | 3.0 | — |
| | | POLYSOL (trade name) AP-3770 (*2) | — | — | — | — | 2.7 |
| | | SUPERFLEX (trade name) 150 (*3) | — | 4.0 | 4.0 | — | — |
| | | VINYBLAN (trade name) 701 (*4) | — | — | — | — | — |
| | Surfactant | OLFINE (trade name) E1010 (*5) (C) | 2.0 | — | — | 2.3 | — |
| | | EMULGEN (trade name) 220 (*6) (D) | — | 1.0 | 1.0 | — | 1.2 |
| | Colorant | Black pigment dispersion liquid (*7) | | | | | |
| | | Carbon Black (D) | 3.9 | 3.9 | 3.9 | — | — |
| | | Resin dispersant (D) | 1.3 | 1.3 | 1.3 | — | — |
| | | Blue pigment dispersion liquid (*8) | | | | | |
| | | Blue pigment (D) | — | — | — | 2.7 | 2.1 |
| | | Resin dispersant (D) | — | — | — | 0.9 | 0.7 |
| | | Red pigment dispersion liquid (*9) | | | | | |
| | | Red pigment (D) | — | — | — | — | — |
| | | Resin dispersant (D) | — | — | — | — | — |
| | | Yellow pigment dispersion liquid (*10) | | | | | |
| | | Yellow pigment (D) | — | — | — | — | — |
| | | Resin dispersant (D) | — | — | — | — | — |
| Water | | | balance | balance | balance | balance | balance |
| (A + B + C)/D | | | 3.431 | 2.118 | 2.059 | 5.803 | 5.597 |
| (B + C)/D | | | 0.490 | 0.216 | 0.882 | 0.955 | 0.224 |
| A + B | | | 33.0 | 21.6 | 21.0 | 36.0 | 37.5 |
| A/B | | | 10.0 | 8.8 | 1.3 | 8.0 | 24.0 |
| (a) Clogging of nozzle | | | AA | A | A | AA | AA |
| (b) Drying property | | | AA | AA | AA | A | A |
| (c) Flexibility and expansibility | | | AA | A | AA | AA | A |
| (d) Anti-scratching and blocking property | | | AA | A | A | A | A |

TABLE 1-continued

| | | | Examples | | | |
|---|---|---|---|---|---|---|
| | | | 6 | 7 | 8 | 9 |
| Water-based ink composition (% by mass) | First water-soluble organic solvent (A) | PG | 29.5 | 30.0 | 25.0 | 25.0 |
| | | 1,3-butanediol | — | — | — | — |
| | | EG | — | — | — | — |
| | Second water-soluble organic solvent (B) | TPG | 1.0 | 3.0 | — | 2.7 |
| | | DEG | — | — | — | — |
| | | GLY | — | — | 3.0 | — |
| | | 1,5-pentanediol | — | — | — | — |
| | | BTG | — | — | — | — |
| | | TPnB | — | — | — | 0.3 |
| | Resin minute particles (D) | MOWINYL (trade name) 6969D (*1) | 4.0 | 4.0 | — | — |
| | | POLYSOL (trade name) AP-3770 (*2) | — | — | — | — |
| | | SUPERFLEX (trade name) 150 (*3) | — | — | — | — |
| | | VINYBLAN (trade name) 701 (*4) | — | — | 8.0 | — |
| | Surfactant | OLFINE (trade name) E1010 (*5) (C) | 2.0 | 2.7 | 1.0 | 1.0 |
| | | EMULGEN (trade name) 220 (*6) (D) | — | — | — | — |
| | Colorant | Black pigment dispersion liquid (*7) | | | | |
| | | Carbon Black (D) | — | — | — | 6.0 |
| | | Resin dispersant (D) | — | — | — | 2.0 |
| | | Blue pigment dispersion liquid (*8) | | | | |
| | | Blue pigment (D) | — | — | — | — |
| | | Resin dispersant (D) | — | — | — | — |
| | | Red pigment dispersion liquid (*9) | | | | |
| | | Red pigment (D) | 3.9 | — | — | — |
| | | Resin dispersant (D) | 1.3 | — | — | — |
| | | Yellow pigment dispersion liquid (*10) | | | | |
| | | Yellow pigment (D) | — | 3.5 | — | — |
| | | Resin dispersant (D) | — | 0.7 | — | — |
| | Water | | balance | balance | balance | balance |
| (A + B + C)/D | | | 3.533 | 4.354 | 3.625 | 3.625 |
| (B + C)/D | | | 0.326 | 0.695 | 0.500 | 0.500 |
| A + B | | | 30.5 | 33.0 | 28.0 | 28.0 |
| A/B | | | 29.5 | 10.0 | 8.3 | 8.3 |
| (a) Clogging of nozzle | | | AA | AA | AA | AA |
| (b) Drying property | | | AA | AA | AA | AA |
| (c) Flexibility and expansibility | | | AA | AA | AA | AA |
| (d) Anti-scratching and blocking property | | | AA | AA | AA | AA |

| | | | Comparative Examples | | | |
|---|---|---|---|---|---|---|
| | | | 1 | 2 | 3 | 4 |
| Water-based ink composition (% by mass) | First water-soluble organic solvent (A) | PG | 10.0 | 6.0 | 34.0 | 40.0 |
| | | 1,3-butanediol | 7.6 | — | — | — |
| | | EG | — | 1.0 | — | — |
| | Second water-soluble organic solvent (B) | TPG | 1.9 | 11.0 | 3.0 | — |
| | | DEG | — | — | 2.0 | — |
| | | GLY | — | — | — | — |
| | | 1,5-pentanediol | — | — | — | 1.2 |
| | | BTG | — | 1.0 | — | — |
| | | TPnB | — | — | — | — |
| | Resin minute particles (D) | MOWINYL (trade name) 6969D (*1) | — | — | 3.0 | — |
| | | POLYSOL (trade name) AP-3770 (*2) | — | — | — | 2.7 |
| | | SUPERFLEX (trade name) 150 (*3) | 4.0 | 4.0 | — | — |
| | | VINYBLAN (trade name) 701 (*4) | — | — | — | — |

TABLE 1-continued

| | | | | | |
|---|---|---|---|---|---|
| Surfactant | OLFINE (trade name) E1010 (*5) (C) | — | — | 2.3 | — |
| | EMULGEN (trade name) 220 (*6) (D) | 1.0 | 1.0 | — | 1.2 |
| Colorant | Black pigment dispersion liquid (*7) | | | | |
| | Carbon Black (D) | 3.9 | 3.9 | — | — |
| | Resin dispersant (D) | 1.3 | 1.3 | — | — |
| | Blue pigment dispersion liquid (*8) | | | | |
| | Blue pigment (D) | — | — | 2.7 | 2.1 |
| | Resin dispersant (D) | — | — | 0.9 | 0.7 |
| | Red pigment dispersion liquid (*9) | | | | |
| | Red pigment (D) | — | — | — | — |
| | Resin dispersant (D) | — | — | — | — |
| | Yellow pigment dispersion liquid (*10) | | | | |
| | Yellow pigment (D) | — | — | — | — |
| | Resin dispersant (D) | — | — | — | — |
| Water | | balance | balance | balance | balance |
| (A + B + C)/D | | 1.912 | 1.863 | 6.258 | 6.149 |
| (B + C)/D | | 0.186 | 1.176 | 1.106 | 0.179 |
| A + B | | 19.5 | 19.0 | 39.0 | 41.2 |
| A/B | | 9.3 | 0.6 | 6.8 | 33.3 |
| (a) Clogging of nozzle | | B | B | AA | AA |
| (b) Drying property | | AA | AA | B | B |
| (c) Flexibility and expansibility | | B | AA | AA | B |
| (d) Anti-scratching and blocking property | | A | B | B | A |

LEGEND
(*1): Acrylic resin emulsion produced by JAPAN COATING RESIN CORPORATION; the numeral in TABLE 1 indicates the active ingredient amount (solid content amount);
(*2): Styrene-acrylic resin emulsion produced by SHOWA DENKO K.K.; the numeral in TABLE 1 indicates the active ingredient amount (solid content amount);
(*3): Urethane resin emulsion produced by DAI-ICHI KOGYO SEIYAKU CO., LTD.; the numeral in TABLE 1 indicates the active ingredient amount (solid content amount);
(*4): Vinyl chloride-acrylic-based copolymer emulsion produced by NISSHIN CHEMICAL INDUSTRY CO., LTD.; the numeral in TABLE 1 indicates the active ingredient amount (solid content amount);
(*5): Nonionic surfactant (liquid at 20° C.) produced by NISSIN CHEMICAL INDUSTRY CO., LTD,, the numeral in TABLE 1 indicates the active ingredient amount;
(*6): Nonionic surfactant (solid at 20° C.) produced by KAO CORPORATION, the numeral in TABLE 1 indicates the active ingredient amount;
(*7): the numeral in upper column in TABLE 1 indicates the pigment solid content amount;
(*8): the numeral in upper column in TABLE 1 indicates the pigment solid content amount;
(*9): the numeral in upper column in TABLE 1 indicates the pigment solid content amount; and
(*10): the numeral in upper column in TABLE 1 indicates the pigment solid content amount.

As indicated in TABLE 1, in Examples 1 to 9 satisfying the conditions (1) and (2), the evaluation results were satisfactory in relation to all of (a) clogging of nozzle, (b) drying property, (c) flexibility and expansibility and (d) anti-scratching and blocking property. Examples 1 to 9 satisfy the condition (3) and the ratio (A/B) in each of Examples 1 to 9 was in the range of 1 to 30.

Further, in Example 1 and 6 to 9 satisfying the conditions (3) and (4), the evaluation results were further satisfactory in relation to all of (a) clogging of nozzle, (b) drying property, (c) flexibility and expansibility and (d) anti-scratching and blocking property.

On the other hand, Comparative Example 1 wherein (A+B+C)/D<2 and (B+C)/D<0.2 and which did not satisfy the condition (1) and the condition (2) as described above had unsatisfactory results in the evaluations of (a) clogging of nozzle, and (c) flexibility and expansibility. Further, Comparative Example 2 wherein (A+B+C)/D<2 and (B+C)/D>1 and which did not satisfy the condition (1) and the condition (2) as described above had unsatisfactory results in the evaluations of (a) clogging of nozzle, and (d) anti-scratching and blocking property. Furthermore, Comparative Example 3 wherein (A+B+C)/D>6 and (B+C)/D>1 and which did not satisfy the condition (1) and the condition (2)

as described above had unsatisfactory results in the evaluations of (b) drying property and (d) anti-scratching and blocking property. Moreover, Comparative Example 4 wherein (A+B+C)/D>6 and (B+C)/D<0.2 and which did not satisfy the condition (1) and the condition (2) as described above had unsatisfactory results in the evaluations of (b) drying property and (c) flexibility and expansibility.

Parts or all of the embodiment and Examples described above can be also described as in the following addenda. However, the present disclosure is not limited to the following addenda.

(Addendum 1) A water-based ink for ink-jet recording including:

a liquid component which is liquid at 20° C.; and
a solid component which is solid at 20° C.,
wherein the liquid component includes:
a first water-soluble organic solvent of which vapor pressure at 20° C. is not less than 7 Pa;
a second water-soluble organic solvent of which vapor pressure at 20° C. is not more than 1 Pa; and
water;
the solid component includes at least one resin selected from the group consisting of: acrylic acid-based resin, maleate ester-based resin, vinyl acetate-based resin, carbonate-based resin, styrene-based resin, ethylene-based resin, propylene-based resin, urethane-based resin, vinyl chloride-based resin and copolymer resin thereof; and the water-based ink for ink-jet recording satisfies the following conditions (1) and (2):

$$2 \le (A + B + C)/D \le 6 \qquad \text{Condition (1)}$$

$$0.2 \le (B + C)/D \le 1 \qquad \text{Condition (2)}$$

wherein in the conditions (1) and (2),

A: a content amount (% by mass) of the first water-soluble organic solvent in an entire amount of the water-based ink, B: a content amount (% by mass) of the second water-soluble organic solvent in the entire amount of the water-based ink, C: a content amount (% by mass) of a component included in the liquid component and different from the first water-soluble organic solvent, the second water-soluble organic solvent and the water in the entire amount of the water-based ink, and D: a content amount (% by mass) of the solid component in the entire amount of the water-based ink.

(Addendum 2) The water-based ink for ink-jet recording according to Addendum 1, wherein the first water-soluble organic solvent includes at least one selected from the group consisting of: propylene glycol, 1, 3-butanediol and ethylene glycol; and the second water-soluble organic solvent includes at least one selected from the group consisting of: tripropylene glycol, diethylene glycol, glycerol, 1,5-pentanediol, triethylene glycol-n-butyl ether and tripropylene glycol-n-butyl ether.

(Addendum 3) The water-based ink for ink-jet recording according to Addendum 1 or 2, further satisfying the following condition (3):

$$10 \le A + B \le 40 \qquad \text{Condition (3)}$$

wherein in the condition (3),

A: the content amount (% by mass) of the first water-soluble organic solvent in the entire amount of the water-based ink, and B: the content amount (% by mass) of the second water-soluble organic solvent in the entire amount of the water-based ink.

(Addendum 4) The water-based ink for ink-jet recording according to any one of Addenda 1 to 3, wherein the water-based ink contains resin minute particles as the at least one resin.

(Addendum 5) The water-based ink for ink-jet recording according to any one of Addenda 1 to 4, further including a colorant.

(Addendum 6) An ink-jet recording apparatus including: an ink storing part (ink storage) storing therein the water-based ink for ink-jet recording as described in any one of Addenda 1 to 5, and an ink discharging mechanism (ink-jet head) configured to discharge the ink stored in the ink storing part.

(Addendum 7) The ink-jet recording apparatus according to Addendum 6, further including a drying mechanism configured to dry a recording part recorded by the ink.

(Addendum 8) An ink-jet recording method including discharging the water-based ink as described in any one of Addenda 1 to 5 by an ink-jet system onto a recording medium.

(Addendum 9) The ink-jet recording method according to Addendum 8, further including fixing the water-based ink to the recording medium by using a drying mechanism configured to dry a recording part of the recording medium.

As described above, the water-based ink related to the present disclosure is capable of suppressing the clogging of nozzle and which has a satisfactory drying state on the recording medium. The usage of the water-based ink related to the present disclosure is not particularly limited to the ink-jet recording on the hydrophobic recording medium such as the coated paper, etc., and is widely applicable to the ink-jet recording on a variety of kinds of recording medium including, for example, plain paper (regular paper), glossy paper, mat paper, etc.

What is claimed is:

1. A water-based ink for ink-jet recording comprising:
a liquid component which is liquid at 20° C.; and
a solid component which is solid at 20° C.,
wherein the liquid component includes:
    a first water-soluble organic solvent of which vapor pressure at 20° C. is not less than 7 Pa;
    a second water-soluble organic solvent of which vapor pressure at 20° C. is not more than 1 Pa; and
    water;
the solid component includes acrylic acid-based resin, pigment particles, and resin dispersant; and
the water-based ink for ink-jet recording satisfies the following conditions (1) and (2):

$$2 \le (A + B + C)/D \le 6 \qquad \text{Condition (1)}$$

$$0.2 \le (B + C)/D \le 1 \qquad \text{Condition (2)}$$

wherein in the conditions (1) and (2),

A: a content amount % by mass of the first water-soluble organic solvent in an entire amount of the water-based ink, B: a content amount % by mass of the second water-soluble organic solvent in the entire amount of the water-based ink, C: a content amount % by mass of a component included in the liquid component and different from the first water-soluble organic solvent, the second water-soluble organic solvent and the water in the entire amount of the water-based ink, and D: a content amount % by mass of the solid component in the entire amount of the water-based ink, wherein the first water-soluble organic solvent is propylene glycol; and the second water-soluble organic solvent contains only tripropylene glycol and B is 1.0% by mass, 2.2% by mass, or 3% by mass, in the entire amount of the water-based ink.

2. The water-based ink for ink-jet recording according to claim 1, further satisfying the following condition (3):

$$10 \le A + B \le 40 \qquad \text{Condition (3)}$$

wherein in the condition (3),

A: the content amount % by mass of the first water-soluble organic solvent in the entire amount of the water-based ink, and B: the content amount % by mass of the second water-soluble organic solvent in the entire amount of the water-based ink.

3. The water-based ink for ink-jet recording according to claim 1, comprising no colorant.

4. The water-based ink for ink-jet recording according to claim 1, further satisfying the following condition (4):

$$3 \le (A + B + C)/D \le 5 \qquad \text{Condition (4)}$$

wherein in the condition (4),

A: the content amount % by mass of the first water-soluble organic solvent in the entire amount of the water-based ink, B: the content amount % by mass of the second water-soluble organic solvent in the entire amount of the water-based ink, C: the content amount % by mass of the component included in the liquid component and different from the first water-soluble organic solvent, the second water-soluble organic solvent and the water in the entire amount of the water-based ink, and D: the content amount (% by mass) of the solid component in the entire amount of the water-based ink.

5. The water-based ink for ink-jet recording according to claim 1, further satisfying the following condition (5):

$$0.3 \le (B + C)/D \le 0.8 \qquad \text{Condition (5)}$$

wherein in the condition (5),

B: the content amount % by mass of the second water-soluble organic solvent in the entire amount of the water-based ink, C: the content amount % by mass of the component included in the liquid component and different from the first water-soluble organic solvent, the second water-soluble organic solvent and the water in the entire amount of the water-based ink, and D: the content amount % by mass of the solid component in the entire amount of the water-based ink.

6. The water-based ink for ink-jet recording according to claim 1, wherein a ratio (A/B) of the content amount (A) of the first water-soluble organic solvent in the entire amount of the water-based ink to the content amount (B) of the second water-soluble organic solvent in the entire amount of the water-based ink is in a range of 1 to 30.

7. An ink-jet recording apparatus comprising:

an ink storage storing therein the water-based ink for ink-jet recording as defined in claim 1, and an ink-jet head configured to discharge the ink stored in the ink storage.

8. The ink-jet recording apparatus according to claim 7, further comprising a drying mechanism configured to dry a recording part recorded by the ink.

9. An ink-jet recording method comprising discharging, onto a recording medium, the water-based ink for ink-jet recording as defined in claim 1.

10. The ink-jet recording method according to claim 9, further comprising drying a recording part of the recording medium by a drying mechanism.

11. The ink-jet recording method according to claim 10, wherein in the drying of the recording part of the recording medium, a drying temperature is in a range of 20° C. to 200° C.

12. The ink-jet recording method according to claim 10, wherein in the drying of the recording part of the recording medium, a drying temperature is in a range of 50° C. to 100° C.

* * * * *